United States Patent [19]

Plus et al.

[11] Patent Number: 5,298,891
[45] Date of Patent: Mar. 29, 1994

[54] DATA LINE DEFECT AVOIDANCE STRUCTURE

[75] Inventors: Dora Plus, South Bound Brook; Peter M. Freitag, Franklin Park, both of N.J.

[73] Assignee: Thomson, S.A., Courbevoie, France

[21] Appl. No.: 687,134

[22] Filed: Apr. 18, 1991

[51] Int. Cl.⁵ .................................. G09G 3/36
[52] U.S. Cl. .......................................... 345/93
[58] Field of Search ............... 340/719, 784; 359/54, 359/87, 88

[56] References Cited

U.S. PATENT DOCUMENTS

| | | | |
|---|---|---|---|
| 4,688,896 | 8/1987 | Castleberry | 340/784 |
| 4,789,857 | 12/1988 | Maurice | 340/784 |
| 4,807,973 | 2/1989 | Kawasaki | 340/784 |
| 4,840,459 | 6/1989 | Strong | 340/784 |

FOREIGN PATENT DOCUMENTS

| | | | |
|---|---|---|---|
| 0197551 | 10/1986 | European Pat. Off. | G09G 3/36 |
| 2605437 | 10/1986 | France | G02F 1/1345 |
| 0059319 | 3/1989 | Japan | 340/784 |
| 0068724 | 3/1989 | Japan | 340/784 |
| 0124825 | 5/1989 | Japan | 340/784 |

*Primary Examiner*—Ulysses Weldon
*Assistant Examiner*—M. Fatahiyar
*Attorney, Agent, or Firm*—J. S. Tripoli; E. P. Herrmann; L. L. Hallacher

[57] ABSTRACT

A data line defect avoidance structure for a display device having an array of display elements arranged in rows and columns includes a plurality of repair lines overlapping the ends of data lines which extend between the columns. Each repair line spans a set of data lines, and there is a sufficient number of repair lines to span all the data lines in the array. One end of each repair line can be welded to a data line during fabrication to decrease the number of steps required for avoiding an open in a data line.

6 Claims, 2 Drawing Sheets

DATA LINE DEFECT AVOIDANCE STRUCTURE

BACKGROUND

This invention relates generally to display devices and particularly to a data line defect avoidance structure for display devices, for example liquid crystal displays.

Liquid crystal television and computer displays are known in the art. A simplified prior art liquid crystal display is shown in FIG. 1. The display includes an array of liquid crystal display elements 11 arranged in rows and columns. Each display element is associated with a switching device 12, such as a thin film transistor (TFT). The gate of each TFT 12 is connected to a select line 13 whereby a complete row of TFT's is simultaneously biased on by each select line 13. The select lines 13 are electrically connected to the output terminals 17 of a select line scanner 21, which provides the biasing voltages to the select lines. Data lines 14-1 through 14-N extend between the columns of display elements 11. The display elements 11 are connected to the data lines 14 by the conduction paths of the TFT's 12. The individual data lines 14 are connected to output terminals 15 of it data line scanner 16. The data lines 14 individually apply brightness voltages to the respective columns of display elements.

Liquid crystal displays for television and computer monitors have a large number of columns of display elements, for example 1,440. A data line 14 and a data line scanner stage are needed for every column of display elements. Accordingly, 1,440 data lines, and 1,440 data line scanner stages are required for the display. Each line is only microns wide and every scanner stage includes a number of solid state devices. For these reasons, the probability that one, or more, scanner stages includes a defective solid state device, or that one, or more, data lines includes an open circuit is very high. A faulty scanner stage is a serious defect because the result is a permanent visible line extending the full length of a column. An open in a data line, such as 18 shown in FIG. 1, is also a serious defect. Display elements which are located on the data line scanner 16 side of an open will receive the proper brightness voltages and operate in the normal fashion. However, display elements which are located on the other side of an open will not receive brightness voltages and therefore these display elements will appear as a permanent visible line in the display. Such visible lines are unacceptable for television and computer monitor uses.

The open data line problem has been addressed in tile prior art by providing a single repair line 19 immediately outside of the display area. Repair line 19 passes over, but is insulated from, the ends of data lines 14-1 through 14-N. The permanent visible line result of an open 18 is avoided by using repair line 19 to connect the open data line to a fully conductive unopen data line. For example, data line 14-3, which includes open 18, and either unbroken data line 14-2 or 14-1 can be welded to repair line 19, preferably using laser welding. Connecting non-adjacent data lines can be preferable because it prevents adjacent data lines from getting the same brightness signal, thereby resulting in a less noticeable defect. Also, repair line 19 is opened on both sides of the two data lines which have been connected together. The opening of repair line 19 is needed to isolate the connected data lines from the remainder of repair line 19 in order to make the remainder of the repair line available for use with other open data lines. The opening of repair line 19 also decreases the parasitic capacitance of the repair line. After the welding and cutting are complete, the display elements which are located on the data line scanner side of defect 18 continue to receive the proper brightness voltages. The display elements which are located on the other side of defect 18 will receive the same brightness voltages as the data line to which they have been connected, data line 14-2 in the example given. Such display elements are thus turned on and off along with the other display elements in the selected row, although they receive the wrong brightness voltages. However, the improper brightness of a portion of one column is a much less noticeable defect than a permanently visible line. The prior art technique is disadvantageous because the avoidance of every data line defect 18 requires two welding and two cutting steps and therefore is time consuming and costly. The prior art technique is also disadvantageous because the effects of defective data line scanner stages can not be avoided using the technique. For this reason there is a need for a data line defect avoidance structure which substantially decreases the number of repair steps needed to avoid the adverse effects of an open data line and which permits the avoidance of the adverse effects of failed data line scanner stages. The present invention fulfills these needs.

SUMMARY

A data line defect avoidance structure for a display device having an array of display elements arranged in rows and columns, and a plurality of data lines arranged between the columns, includes a plurality of repair lines individually spanning the ends of sets of consecutive data lines. The repair lines enable the electrical connection of any two data lines within a set. The number of repair lines is sufficient to span all of the data lines.

DETAILED DESCRIPTION

Figure 1:
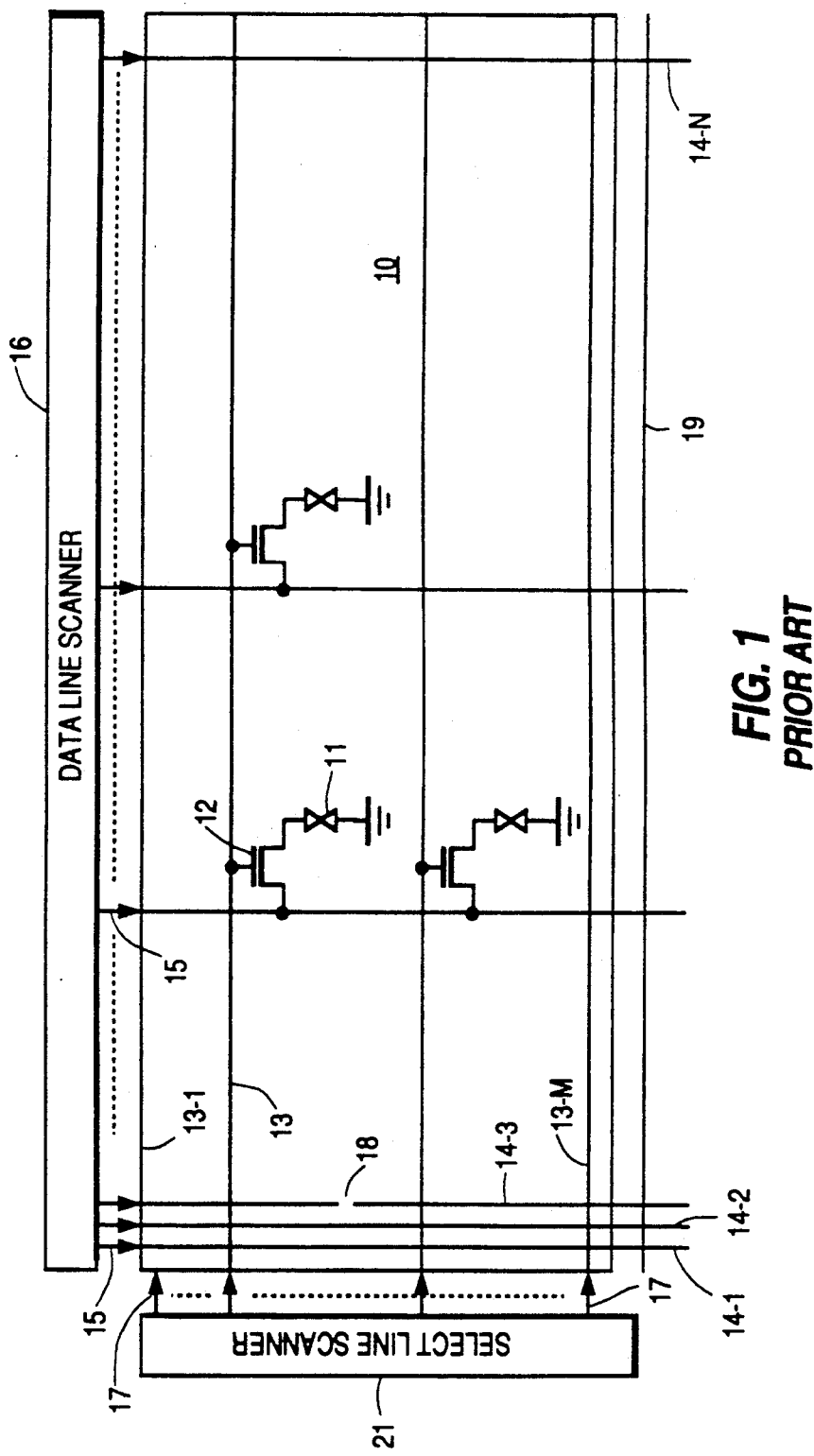
FIG. 1 shows a prior art data line defect avoidance structure.
Figure 2:
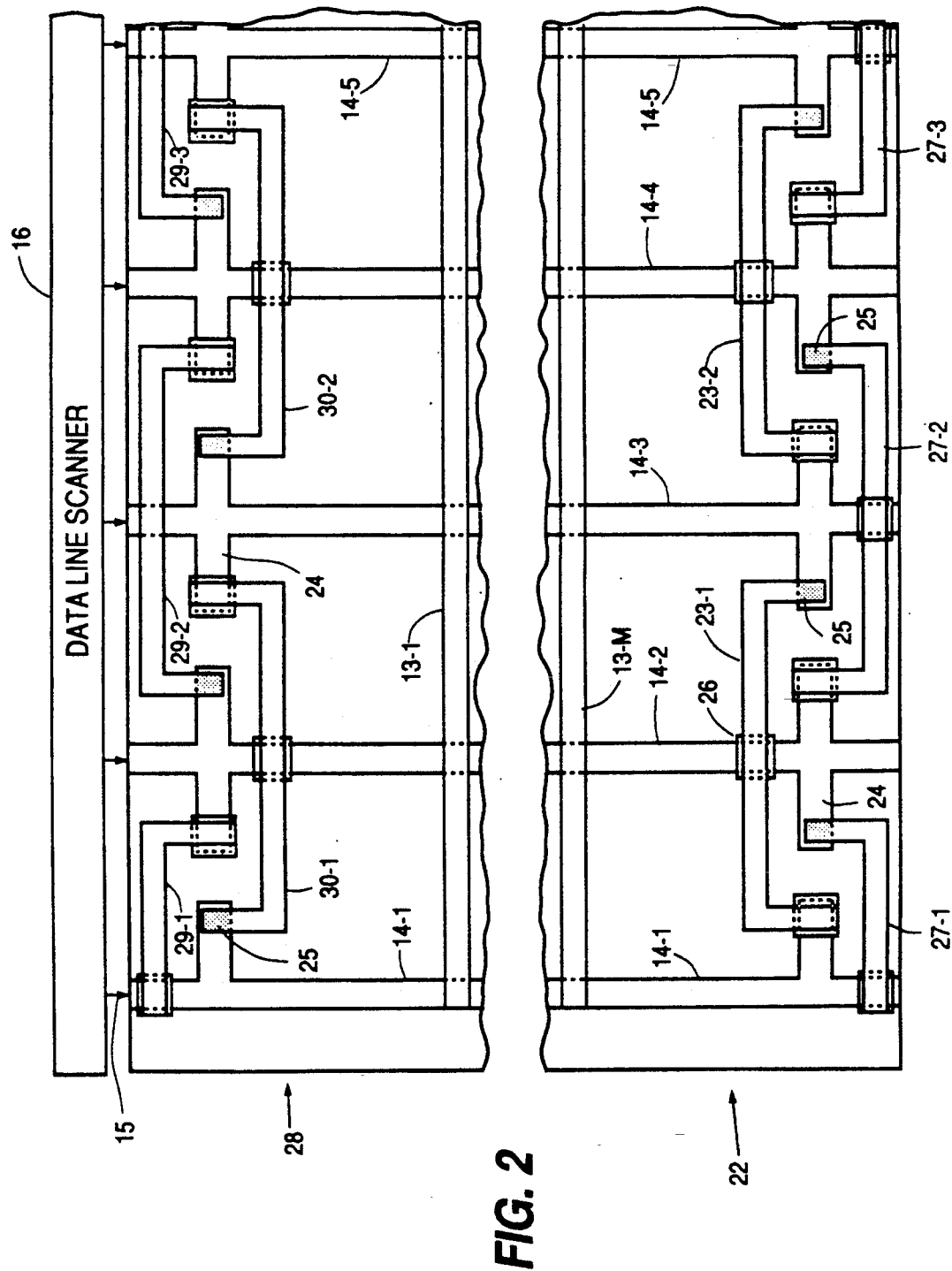
FIG. 2 is a preferred embodiment.

In FIG. 2, data lines 14 extend beyond the last select line 13-M into a first repair area 22, which includes the means needed to avoid the effects of data line opens. A first plurality of repair lines 23 each span the same number of data lines and thus divide the data lines into sets, each of which includes the same number of data lines. There is a sufficient number of repair lines to span all data lines in the display. Each data line 14 has integral tabs 24 extending from both sides of the line. Repair lines 23 are substantially U-shaped members dimensioned so that the legs of the U's overlap the tabs 24 of alternate data lines 14. Each repair line 23 thus spans three consecutive data lines, in the preferred embodiment shown. As indicated by the darkened areas 25, one end of each repair line 23 is permanently connected to a tab 24 of one data line 14. Repair lines 23 are insulated from the other two data lines within the set, as indicated at 26. The repair lines 23 thus, in effect, divide the data lines into sets of three. An open in any of the data lines can be avoided simply by laser welding one of the repair lines 23 to the data line including the open.

A second plurality of repair lines 27 are identical in configuration to repair lines 23 and divide the data lines 14 into second sets of three. The first and second repair lines are staggered whereby each of the second sets includes two data lines from one of the first sets, and one data line from another of the first sets. Repair lines 23 and 27 each have one end connected to alternate data lines. Thus, for example, repair lines 23 each have one end permanently connected to an odd numbered data line, and repair lines 27 have at one end permanently connected to an even numbered data line. The use of the second set of repair lines 27 is particularly advantageous when several consecutive data lines include opens. In such an instance, the opens in adjacent data lines can be avoided by different data lines so that adjacent data lines do not receive the same brightness signal. For example, if data lines 14-1 and 14-2 both contain an open, the open in line 14-1 can be avoided by welding repair line 23-1 to data line 14-1. The open in data line 14-2 can be avoided by welding the data line to repair line 27-2. Data line 14-1 and 14-2 will then receive the same brightness signals as data lines 14-3 and 14-4, respectively.

In FIG. 2, a second repair area 28 is arranged between the first select line 13-1 and data line scanner 16. Data lines 14-1 through 14-N pass through repair area 28 and are connected to the output terminals 15 of data line scanner 16. Third and fourth pluralities of repair lines 29 and 30, respectively are arranged in repair area 28 and cross over the data lines 14. The repair lines 29 and 30 divide the data lines into sets in the same manner as repair lines 26 and 27. In FIG. 2, the repair lines in repair areas 22 and 28 are mirror images, this is not a critical feature, the repair lines in the two areas can be offset. Each repair line is permanently connected to a data line whereby repair lines 29 are connected to even numbered data lines and repair lines 30 are connected to odd numbered data lines. The third and fourth sets of repair lines are useful in avoiding the visible line effects caused by failed data line scanner stages. The data line of the failed stare is connected to a nearby data line by one of the repair lines 29 or 30. If necessary, the failed stage can be disconnected from the associated output terminal 15, or the output terminal can be disconnected from its associated data line, typically either operation is performed by laser cutting.

The invention is advantageous because permanently visible lines resulting from failed data line scanner stages are made to change in brightness thereby replacing an unacceptable flaw with a barely noticeable acceptable flaw and substantially improving the display. The invention is also advantageous because the permanently visible lines caused by open data lines are avoided using a single welding step, while with the prior art structure two welding and two cutting steps are needed.

What is claimed is:

1. A data line avoidance structure for a display device having an array of display elements arranged in rows and columns and a plurality of data lines arranged between said columns, said avoidance structure comprising:

a first plurality of repair lines each of said repair lines individually spanning the ends of adjacent lines to divide said data lines into sets and enable the electrical connection of any two data lines within a set with the spanning repair line, the number of said repair lines being sufficient to divide all of said data lines into sets, each individual repair line being electrically connected to one data line within a set and electrically insulated from the rest of the data lines within said set; and a second plurality of repair lines individually spanning second sets of data lines, said second sets including a portion of the data lines spanned by said first repair lines and at least one additional line, said second repair lines being electrically connected to said additional data line and electrically insulated from data lines common to said first and second sets.

2. The avoidance structure of claim 1 wherein said first and second sets each include three data lines.

3. The avoidance structure of claim 1 wherein said data lines include tabs electrically connected to and extending from said data lines, and wherein said repair lines are substantially U-shaped members dimensioned so that the legs of said U-shaped members overlap the tabs of alternate data lines.

4. The avoidance structure of claim 1 wherein said display device includes a data line scanner for providing brightness signals to said data lines, and wherein said avoidance structure further includes a repair area arranged between said data line scanner and said rows of display elements, and an additional plurality of repair lines arranged in said repair area and individually spanning said data lines to divide said data lines into additional sets.

5. The avoidance structure of claim 4 further including a further plurality of repair lines arranged in said repair area and individually spanning said data lines to divide said data lines into further sets.

6. The avoidance structure of claim 5 wherein said further sets include a portion of the data lines spanned by said additional repair lines and at least one other line, said further repair lines being electrically connected to said other data line and electrically insulated from data lines common to said additional and said further sets.

* * * * *